(12) United States Patent
Intravatola

(10) Patent No.: US 9,103,495 B2
(45) Date of Patent: Aug. 11, 2015

(54) INTEGRATED PORTABLE STAND, POWER SUPPLY, AND CONTROL PANEL

(75) Inventor: Lawrence Shane Intravatola, Virginia Beach, VA (US)

(73) Assignee: AIR SYSTEMS, INC., Chesapeake, VA (US)

( * ) Notice: Subject to any disclaimer, the term of this patent is extended or adjusted under 35 U.S.C. 154(b) by 0 days.

(21) Appl. No.: 13/376,156

(22) PCT Filed: Jun. 3, 2010

(86) PCT No.: PCT/US2010/037342
§ 371 (c)(1),
(2), (4) Date: Mar. 23, 2012

(87) PCT Pub. No.: WO2010/141790
PCT Pub. Date: Dec. 9, 2010

(65) Prior Publication Data
US 2012/0168576 A1    Jul. 5, 2012

Related U.S. Application Data

(60) Provisional application No. 61/183,950, filed on Jun. 3, 2009.

(51) Int. Cl.
*F16M 11/28* (2006.01)
*F16M 11/10* (2006.01)
(Continued)

(52) U.S. Cl.
CPC .............. *F16M 11/28* (2013.01); *F16M 11/10* (2013.01); *F16M 11/2014* (2013.01); *F21S 9/02* (2013.01);
(Continued)

(58) Field of Classification Search
CPC ....... F16M 13/00; F16M 11/16; F16M 11/28; F16M 11/42; F16M 2200/08; F16M 11/02; F21V 21/06; F21V 17/007; F21L 13/06; F21L 4/04; A47B 96/06
USPC .......... 248/125.1, 685, 27.1, 170, 439, 440.1; 206/569, 573, 575, 576, 577, 579, 320, 206/803; 373/880, 881, 882, 883, 889
See application file for complete search history.

(56) References Cited

U.S. PATENT DOCUMENTS

| | | | |
|---|---|---|---|
| 1,521,610 A | | 1/1925 | Finesilver |
| 2,285,868 A | * | 6/1942 | Muller .......................... 362/413 |

(Continued)

FOREIGN PATENT DOCUMENTS

| | | |
|---|---|---|
| CN | 1066110 | 11/1992 |
| CN | 200980118386.X | 6/2012 |

(Continued)

OTHER PUBLICATIONS

The State Intellectual Property Office of the People's Republic of China, The First Office Action, Application No. 201080034761.9, Jul. 2, 2013 & Reply to The First Office Action of Jul. 2, 2013.

(Continued)

*Primary Examiner* — Nkeisha Smith
(74) *Attorney, Agent, or Firm* — Daniel Schein, Esq.

(57) ABSTRACT

A portable stand with an integral power supply and controller, a mast for supporting a functional device and a stabilizing leg assembly comprises a main housing for a power supply, and connected to the main housing are retractable and extendable support legs and an extendable and retractable mast. The mast includes a mount for holding at least one functional device to form a single, integral unit that provides for storage, stable support and power for a functional device that is mounted onto the mast, and portability.

11 Claims, 9 Drawing Sheets

(51) Int. Cl.

| | | |
|---|---|---|
| *F16M 11/20* | (2006.01) | |
| *F21S 9/02* | (2006.01) | |
| *F21V 17/00* | (2006.01) | |
| *F21V 21/00* | (2006.01) | |
| *F21V 21/06* | (2006.01) | |
| *F21V 21/22* | (2006.01) | |
| *F21W 131/10* | (2006.01) | |
| *F21W 131/103* | (2006.01) | |

(52) U.S. Cl.
CPC .............. *F21V 17/007* (2013.01); *F21V 21/00* (2013.01); *F21V 21/06* (2013.01); *F16M 2200/08* (2013.01); *F21V 21/22* (2013.01); *F21W 2131/103* (2013.01); *F21W 2131/1005* (2013.01)

(56) References Cited

U.S. PATENT DOCUMENTS

| | | | |
|---|---|---|---|
| 2,531,215 A | 11/1950 | Harmon | |
| 3,315,621 A | 4/1967 | Szymber | |
| 3,415,476 A * | 12/1968 | McDermott | 248/166 |
| 3,812,847 A | 5/1974 | Moore et al. | |
| 4,181,929 A * | 1/1980 | Barber et al. | 362/192 |
| 4,220,981 A * | 9/1980 | Koether | 362/486 |
| 4,771,293 A | 9/1988 | Williams et al. | |
| 4,790,416 A | 12/1988 | Baker | |
| 4,815,757 A | 3/1989 | Hamilton | |
| 4,830,579 A | 5/1989 | Cheng | |
| 5,012,394 A * | 4/1991 | Woodward | 362/198 |
| 5,137,236 A | 8/1992 | Burns | |
| D344,709 S | 3/1994 | Cooper | |
| D345,137 S | 3/1994 | Thomas | |
| 5,400,019 A * | 3/1995 | Riscoe, Jr. | 340/908 |
| D356,996 S | 4/1995 | Henderson et al. | |
| 5,418,701 A | 5/1995 | Hart | |
| 5,459,648 A | 10/1995 | Courtney | |
| 5,531,419 A | 7/1996 | Gustafsson et al. | |
| 5,808,450 A * | 9/1998 | Chula et al. | 322/22 |
| D400,509 S | 11/1998 | Brunelle | |
| 5,833,352 A | 11/1998 | Goodwin | |
| D409,138 S | 5/1999 | Gammenthaler | |
| 5,934,628 A | 8/1999 | Bosnakovic | |
| 5,964,524 A | 10/1999 | Qian | |
| 6,007,032 A | 12/1999 | Kuo | |
| 6,585,428 B1 * | 7/2003 | Wesselink et al. | 396/427 |
| 6,659,620 B2 | 12/2003 | Goto | |
| 6,682,209 B2 * | 1/2004 | Drake et al. | 362/403 |
| 6,805,462 B1 * | 10/2004 | Smith et al. | 362/192 |
| 6,902,294 B2 * | 6/2005 | Wright | 362/191 |
| 6,926,428 B1 | 8/2005 | Lee | |
| 7,246,913 B2 * | 7/2007 | Ossolinski | 362/96 |
| 7,350,671 B2 * | 4/2008 | Mika et al. | 222/129 |
| 7,397,435 B2 | 7/2008 | McEwan | |
| 7,432,868 B2 * | 10/2008 | Webb et al. | 343/766 |
| 7,470,036 B2 * | 12/2008 | Deighton et al. | 362/109 |
| 7,484,858 B2 * | 2/2009 | Deighton et al. | 362/109 |
| 7,598,916 B2 * | 10/2009 | Inbal et al. | 343/718 |
| 7,607,630 B2 * | 10/2009 | Jung et al. | 248/440.1 |
| 7,628,271 B1 | 12/2009 | Marton | |
| 7,679,573 B2 | 3/2010 | Shuster et al. | |
| 7,731,398 B2 * | 6/2010 | Probasco | 362/428 |
| 7,870,937 B1 * | 1/2011 | Arnao | 190/1 |
| 8,068,062 B2 * | 11/2011 | Webb et al. | 343/766 |
| 8,075,208 B2 * | 12/2011 | Green | 400/94 |
| 8,172,438 B2 * | 5/2012 | Konop | 362/485 |
| 8,181,811 B1 * | 5/2012 | Blake | 220/475 |
| 8,200,150 B2 * | 6/2012 | Lopez et al. | 455/13.2 |
| D667,787 S | 9/2012 | Druker et al. | |
| 8,362,963 B2 * | 1/2013 | Rakotoarisoa et al. | 343/757 |
| D685,324 S | 7/2013 | Deck et al. | |
| 2001/0046258 A1 * | 11/2001 | Wise et al. | 375/219 |
| 2002/0063072 A1 * | 5/2002 | Pham | 206/320 |
| 2003/0103357 A1 | 6/2003 | Drake et al. | |
| 2003/0137847 A1 | 7/2003 | Cooper | |
| 2007/0159781 A1 | 7/2007 | Zbikowski | |
| 2008/0129543 A1 * | 6/2008 | Lee | 340/908 |
| 2009/0091940 A1 * | 4/2009 | Probasco | 362/372 |
| 2009/0284963 A1 * | 11/2009 | Intravatola | 362/190 |
| 2010/0039801 A1 | 2/2010 | Pelletier et al. | |

FOREIGN PATENT DOCUMENTS

| | | |
|---|---|---|
| DE | 3825666 | 9/1989 |
| EP | 09747498.5 | 10/2012 |
| JP | 11-317110 | 11/1999 |
| JP | 3138812 | 2/2001 |
| JP | 2002-365717 | 12/2002 |
| JP | 2005158316 | 6/2005 |
| KR | 10-2010-7028107 | 8/2012 |
| TW | 098115754 | 10/2011 |
| WO | 03/098097 | 11/2003 |
| WO | PCT/US2009/43829 | 5/2009 |

OTHER PUBLICATIONS

European Patent Office, Search Report, Application No. 10784134.8, Nov. 6, 2012 & Response to Search Report of Nov. 6, 2012.
Office Action, Japanese Application No. 2012-513364, Jan. 7, 2013 & Response to Office Action of Jan. 7, 2013.
Office Action, Japanese Application No. 2012-513364, Aug. 20, 2013 & Response to Office Action of Aug. 20, 2013.
Canadian Intellectual Property Office, Examiner's Report, Application 2,764,435, Jul. 25, 2013 & Response to Examiner's Report of Jul. 25, 2013.
European Patent Office, Search Report, Application No. 09747498.5, Nov. 9, 2012 & Response to Search Report of Nov. 9, 2012.
Korean Intellectual Property Office, Notice to Submit Response, Application No. 10-2010-7028107, Aug. 22, 2012 & Reply to the notice to Submit Response of Aug. 22, 2012.
Canadian Intellectual Property Office, Examiner's Report, Aug. 6, 2012, & Request for Reinstatement and Response to Examiner's Report of Aug. 6, 2012.
Taiwanese Office Action, Patent Application No. 098115754, Oct. 27, 2011 & Reply to the Office Action of Oct. 27, 2010.
The State Intellectual Property Office of the People's Republic of China, The First Office Action, Application No. 200980118376.X, Jun. 4, 2012 & Reply to the First Office Action of Jun. 4, 2012.
International Search Report, PCT/US09/43829, Aug. 27, 2009.
The State Intellectual Property Office of the People's Republic of China, The Third Office Action, Application No. 201080034761.9, Jun. 30, 2014.
International Search Report, PCT/US2014/060037, Jan. 29, 2015.
Japanese Office Action, 2014-117482, Apr. 21, 2015.
Canadian Office Action, 2,764,435, Mar. 31, 2015.

* cited by examiner

INTEGRATED PORTABLE STAND, POWER SUPPLY, AND CONTROL PANEL

CROSS-REFERENCE TO RELATED APPLICATIONS

The present invention is a Nation Stage Entry of PCT/US10/37342, entitled "INTEGRATED PORTABLE STAND, POWER SUPPLY AND CONTROL PANEL", filed Jun. 3, 2010, which claims the benefit of U.S. Provisional Patent Application Ser. No. 61/183,950, entitled "INTEGRATED PORTABLE STAND, POWER SUPPLY AND CONTROL PANEL", filed Jun. 3, 2009.

FIELD OF THE INVENTION

The present inventions relate to stands for supporting items in an elevated position with respect to the surroundings, and more specifically relates to stands that are portable, easy to set up for use at a site, easy to collapse for storage and transport, and that do not require connection of parts at a site of use to function nor disconnection of any parts after use in order to collapse the stand for storage and transport.

BACKGROUND

Reference is made to copending U.S. patent application Ser. No. 12/432,525, filed Apr. 29, 2009, entitled COLLAPSIBLE PORTABLE STAND WITH TELESCOPING SUPPORT AND INTEGRAL STORAGE CASE, which details relevant background regarding the ubiquitous need for temporary stands to support items, such as functional devices, at an elevated position with respect to their surroundings, and provides embodiments of solutions therefore. The disclosure of U.S. patent application Ser. No. 12/432,525 is incorporated herewith as if reproduced in full herein. While the new stands disclosed in the aforementioned patent application have many benefits over the prior art, there is a need for a stand that comprises an integrated power supply and controls, that is robust, easy to set up and collapse, is self-contained, and yet can be made more economically and/or with fewer parts. It is desired to have the power supply and controls contained inside of a housing of the stand that remains closed during transportation, set-up, use, and removal for subsequent transport. Further, it is desired that no parts have to be connected together at a site of use for a functional device attached to the stand to be operated.

The need for temporary stands to support items at an elevated position with respect to their surroundings is ubiquitous. For example, temporary lighting is a common functional device that is required for dark and remote job sites. However, if there are multiple parts that need to be connected in the dark in order to set up the platform, work will be delayed, injuries can occur and parts can be lost and/or not available at all. Even if there is a light, a stand that is not self contained and that requires connection of parts to erect for use causes a delay in starting work at the job site while parts are located, if not lost, and connected together. Microphones, podium platforms, loudspeakers, cameras, sensors, and surveying equipment are only a few of the functional devices that require support by a stand and that would benefit if the stand can be set up quickly and collapsed for storage and transport. Further, a portable stand for different functional devices may be required for use at various locations over time. The user generally needs the stand along with numerous other items to meet particular needs. For example, a road crew that works at night may need to use a light stand and many other pieces of equipment. So, a stand of small size, low weight, and that is simple to set up and collapse for storage is desired. The stand must also be robust for repetitive use, rough handling, and corrosive environments. For use in dangerous environments, the stand and its components should be intrinsically safe. When deployed, the stand should be stable under expected conditions of use. For example, a stand holding a work light should not tip over when set up in a location where there are strong winds and/or where it may be jostled by surrounding people and equipment. Job sites that have explosive, fire or other safety hazards also require equipment to be intrinsically safe.

SUMMARY OF THE INVENTIONS

Referring to FIGS. 1 to 4, there is shown an exemplary stand of the present invention from different views. The stand of the present inventions comprises a main housing for holding a power supply and controller. A leg assembly is attached to the housing, shown in collapsed form in FIGS. 1 to 4, and shown in an extended configuration in FIG. 5. The legs of the leg assembly can be extended outward from the housing to increase stability of the stand. A telescoping mast is attached to the housing, and includes a mount for a functional device at the top thereof. Electric power and control signals can be transmitted from inside of the housing to the functional device by at least one cord that is coiled to reduce bulk. The power and control conduit is contained in a protective sleeve from which it can be extended when the telescoping arm is extended and into which the bias of the coil and gravity permit retraction into the sleeve when the telescoping art is retracted. Mounted on the top of the telescoping arm is a fitting for mounting a functional device, the functional device being show in the Figures being a light. The fitting includes a housing that enables electrical power and signals from the control conduit to be connected to the functional device, while also maintaining a weather tight seal. The fitting provides at least 2 directions of adjustment (also referred to as degrees of freedom), so that the functional device can be rotated about the axis of the telescoping arm and pointed up or down. Further details of exemplary embodiments of the present invention are provided below after a brief summary of the drawings.

FURTHER DETAILS OF EXEMPLARY EMBODIMENTS

Figure 1:
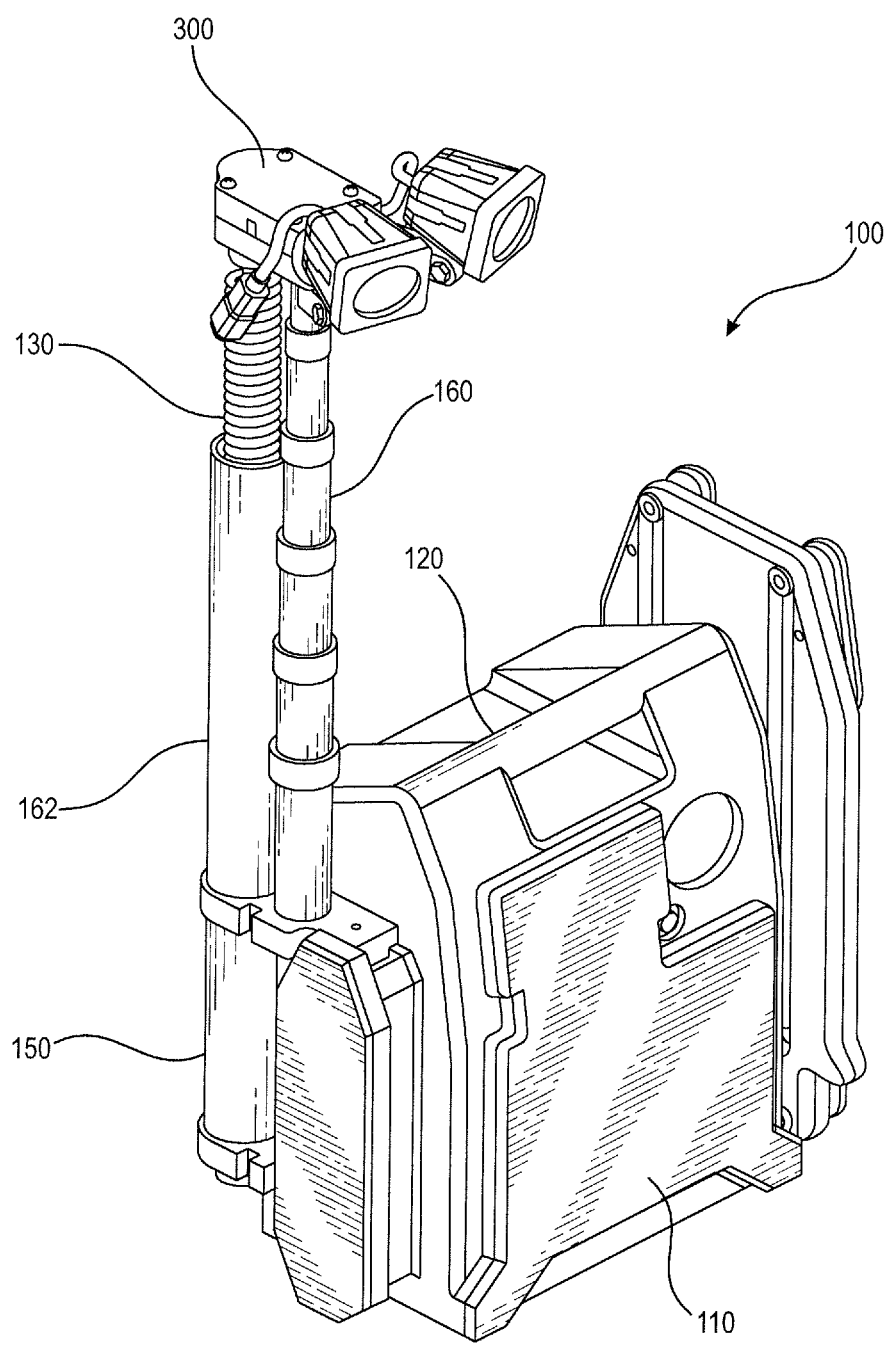
FIGS. 1 to 4 are, respectively, a front top perspective view of the stand with the telescoping arm assembly in the foreground, a front top perspective view of the stand with the collapsed or retracted leg assembly in the foreground, a rear top perspective view of the stand with the collapsed leg assembly in the foreground, and a side elevation view with the telescoping assembly in the foreground.
Figure 2:
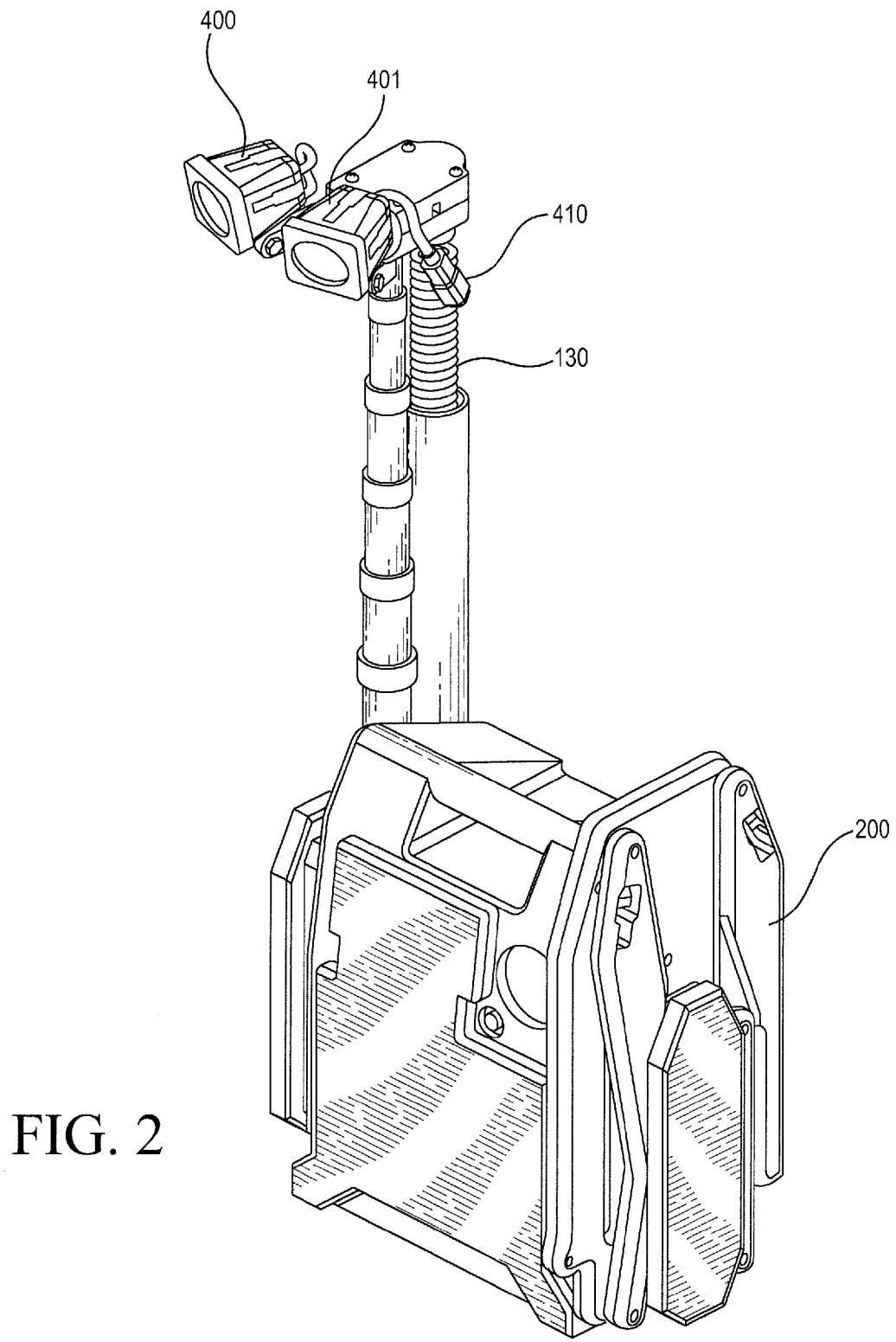
Figure 3:
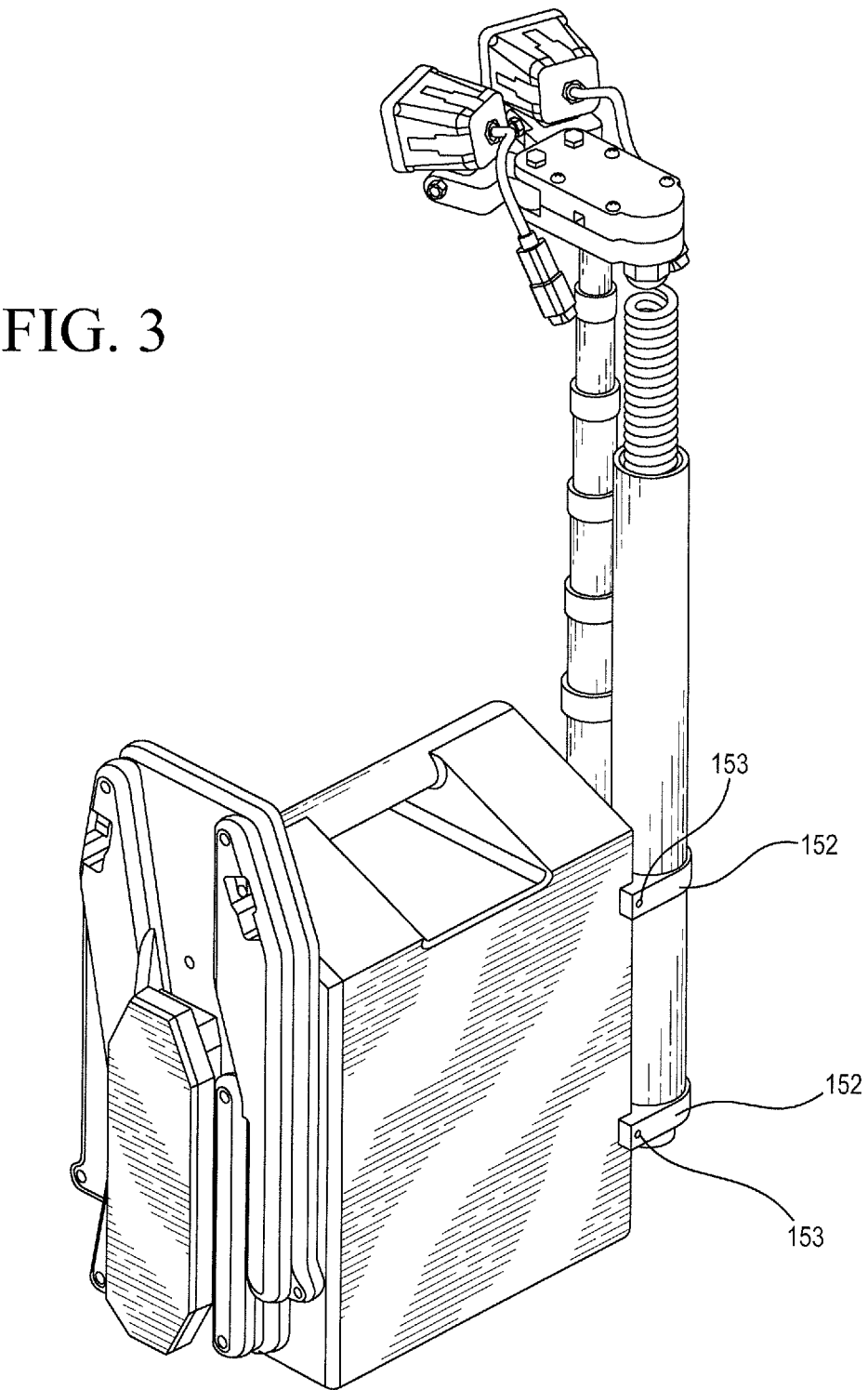
Figure 4:
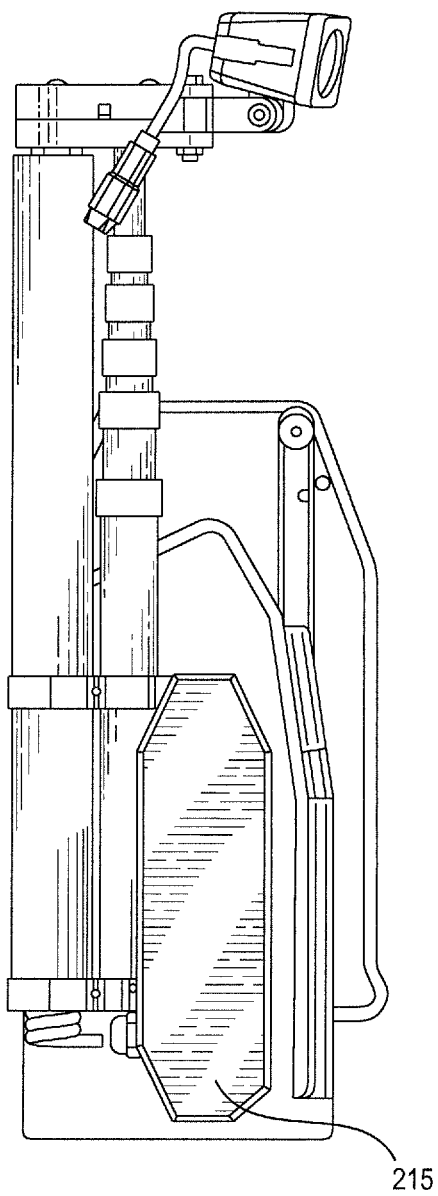

The following provides further details of the present inventions as summarized above and illustrated in the drawings. Part numbers in the description correlated to one or more parts indicated in the drawings, but to focus attention on the features of the invention, not all parts are numbered or shown in detail. Referring to FIGS. 1 to 4, an exemplary, non-limiting embodiment of a stand 100 the present inventions is illustrated. A main housing 110 preferably contains a power supply and control panel. Access plugs for recharging and/or connecting the stand to a power supply are provided. In a preferred embodiment, a rechargeable battery is contained within the housing. In an embodiment, a 12 volt power port is provided on the main housing. The battery is preferably connected to a battery fitting to maintain it securely fixed in the housing and free from the environment. Preferably, the battery or other power supply is connected to electrical connections within the housing, and at least one power cord leads from the interior of the main housing through a sealed port to provide an external source of power for functional devices from the internal power supply.

Figure 5:
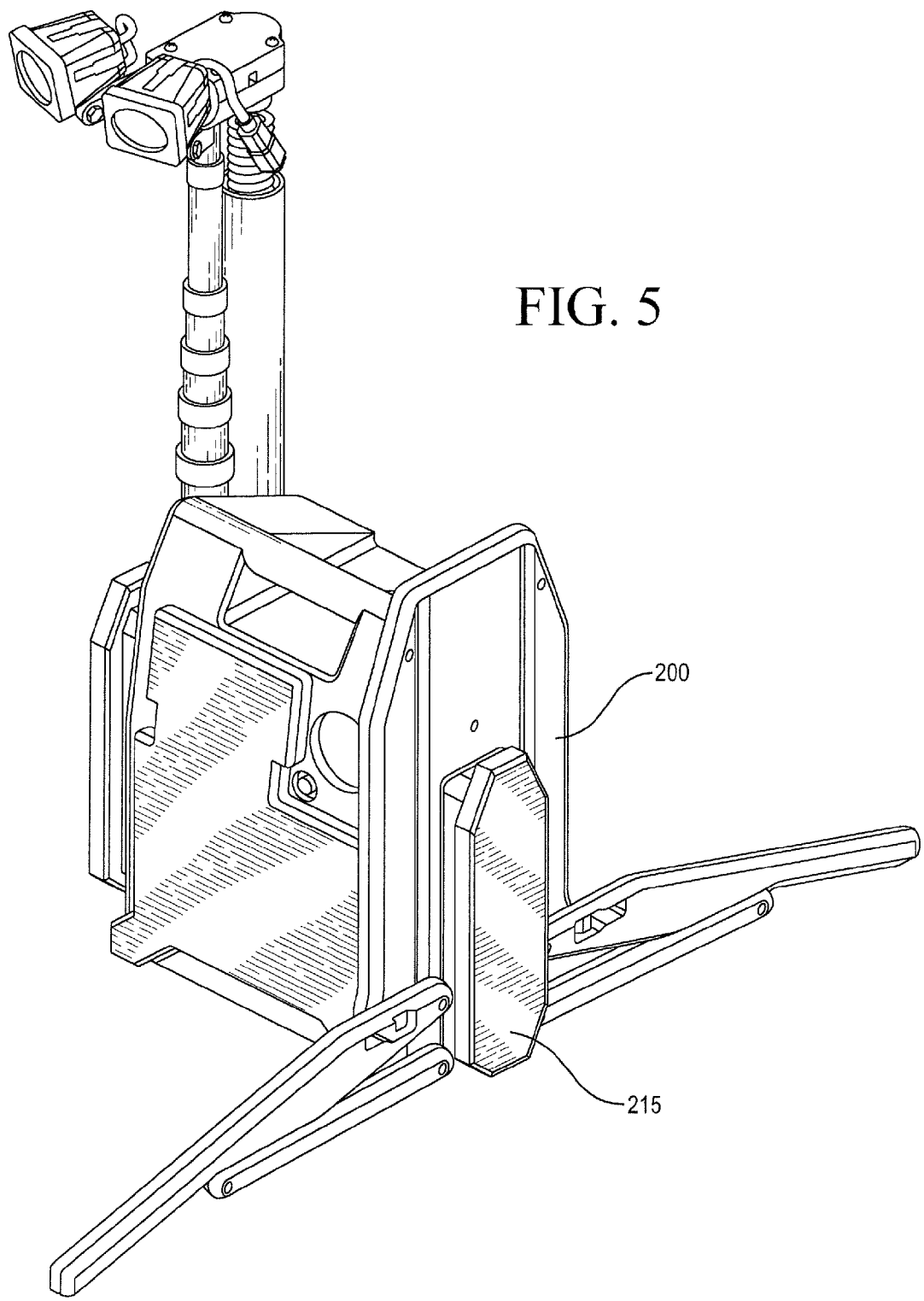
FIG. 5 is a front top perspective view of the stand with the leg assembly extended and in the foreground.

Main housing 110 is preferably formed of a robust and durable plastic material, and includes a grip for ease of carrying. A power cord 130 provides power for functional attachments that can be connected to a mast assembly 150. A leg assembly 200 is also provided on the main housing to provide stability for the stand 100. In FIGS. 1 to 4, leg assembly 200 is retracted, which is a preferred configuration for transport and storage. As shown in FIG. 5, the leg assembly can be extended to increase stability for the stand. The leg assembly 200 is engaged with a cord wrap projection 215 on the housing in the Figures. While the embodiment showing in the Figures uses a preexisting commercially available housing for a power supply that includes power cord wrap projections 215 on opposite sides of the main housing 110, the leg assembly can be attached to the stand other than as shown. An exemplary housing and power supply can be obtained from Clore Automotive of Lenexa, Kans., U.S.A., for example a Jump-N-Carry model JNC950 or JNC660.

Extendable mast assembly 150 is mounted near to and/or engaged with a second cord wrap projection on the main housing. The second cord wrap projection may be eliminated in other embodiments and the mast assembly may project upwards from the main housing 110 from a suitable integral cavity formed therein. One of more brackets 152 are used to mount the telescoping assembly to the housing via mounting holes 153. The mast assembly 150 includes an extendable mast 160 and a cord protection sleeve 162, both of which are engage by brackets 152 to securely hold them to the main housing 110. A functional device mount 300 is mounted to the top of the telescoping mast 160. Lights 400 and 401 are shown mounted to the mount 300, and have electrical sockets 410 for connection to the power cord 130. Other types of functional device can be mounted to the mast. Further, the mast may include more than one mount, such as mount 300, for greater flexibility of use. Further details of the functional device mount are provided with the subsequently in reference to FIGS. 10 and 11.

Figure 6:
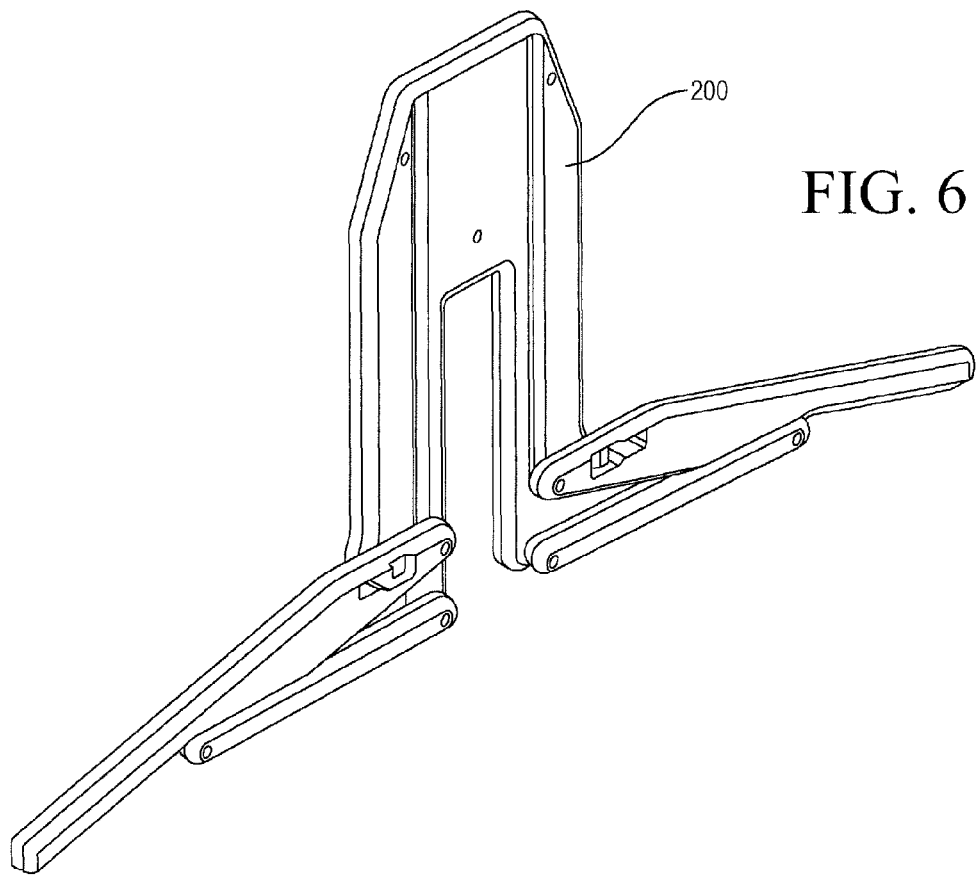
FIGS. 6 and 7 are, respectively, a top side perspective view of the isolated leg assembly in an extended configuration and in a collapsed configuration.
Figure 7:
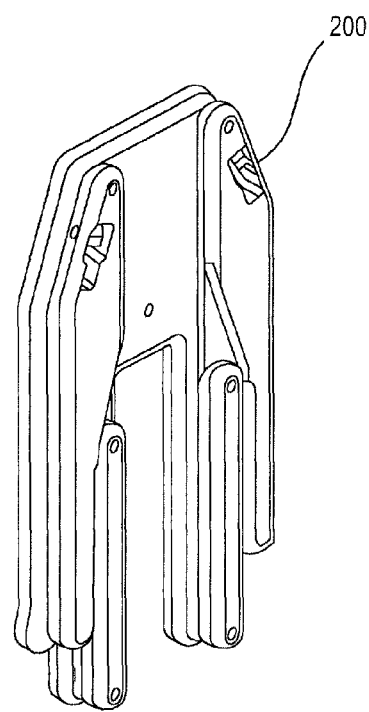
Figure 8:
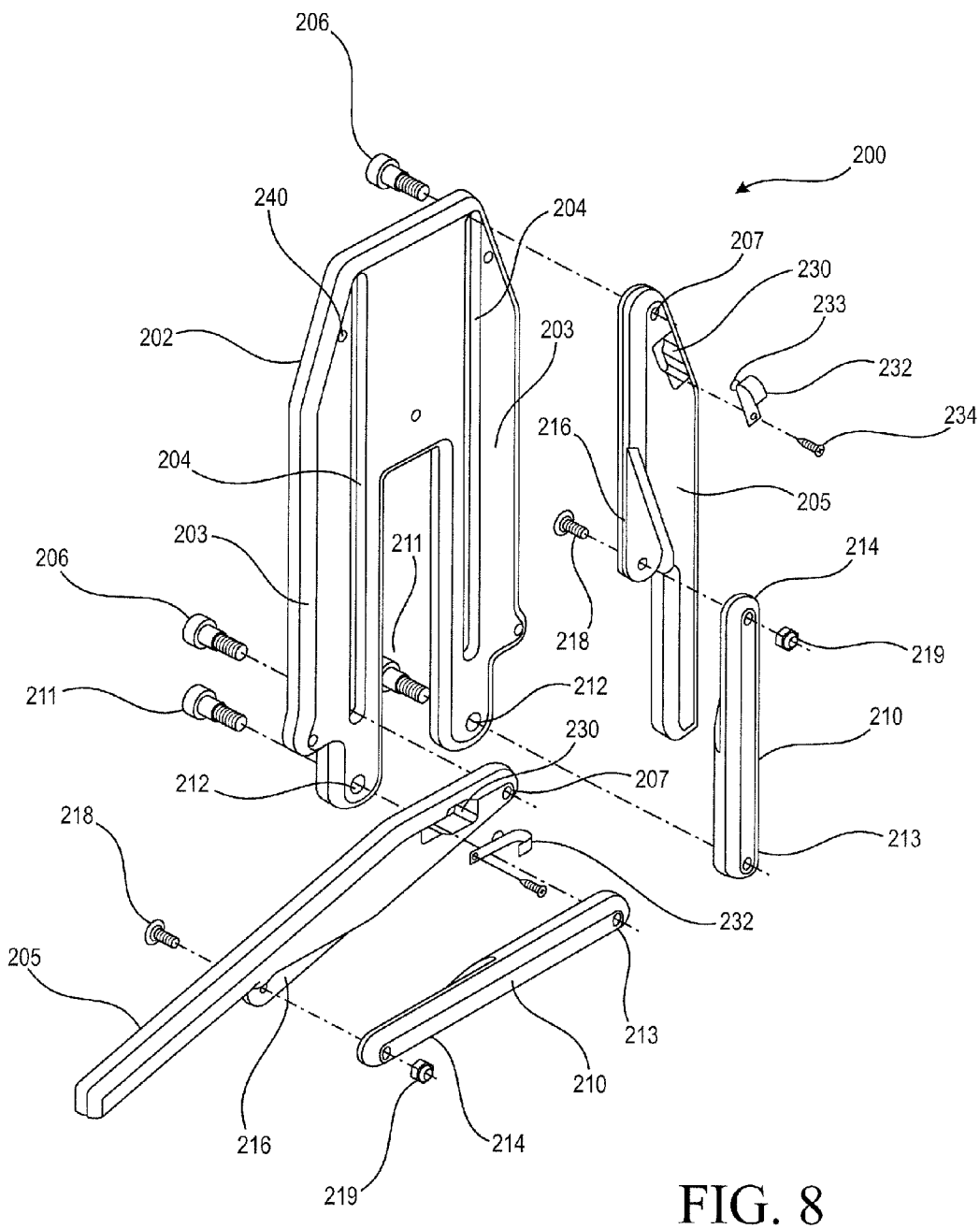
FIG. 8 is an exploded view of the leg assembly and its components.

Referring to FIGS. 6 to 8, the leg assembly 200 is shown in isolated form in its extended formation in FIG. 6, in its retracted formation in FIG. 7, and in an exploded view of its parts in FIG. 8. A main panel 202 has two branches 203 that extend downward in order for the panel 202 to fit over the cord wrap protrusion 215 on the housing. Extending vertically in both branches 203 are elongated channels 204; first and second legs 205 are pivotally and slidably connected to the panel 202 via bolts 206 that pass through the channels 204 to connect to upper mount holes 207 in each leg. Bolts 206 and others are shown as shoulder bolts, wherein the wide top portion cannot pass through a hole into which the threaded portion is inserted. First and second struts 210 are pivotally mounted to panel 202 via bolts 211 that pass through mount holes 212 5 in panel 202 and mount holes 213 on the inner portion of each strut 210. Each strut 210 is pivotally connected at its outer end 214 to a flange 216 on one of legs 205; struts 210 are connected to flanges 216 by bolts 218 and nuts 219. Elongated channels 204 permit the inner portions of legs 205 to slide up and down, while struts 210 limit the travel of the outer portions of the leg outward 10 from the panel 202. When legs 205 are completely retracted so that the inner portion of each leg is near the top of the panel 202 and the lower portion is adjacent the panel, the outer portion of each strut is vertically aligned above the inner portion of each strut (the inner and lower portions of each strut being pivotally mounted to mounting holes 212 in panel 202).

In order for the leg assembly to be locked into an open or retracted configuration, a biased push button mechanism is provided. Each leg 205 has a T-slot 230 in which is mounted a spring 232 which has a button 233. Screws 234 are used to mount the springs to the legs 205. Detents, such as detent 240 on the panel 202 engage with button 233 to maintain the legs in the retracted position, while a lower detent in panel 202 locks the legs in the extended position. By simply pressing on the spring with a finger, the legs will either retract or extend depending on the direction the legs are pushed. Bolts used may be of metal or other suitable material, while spring steel is recommended for spring 232. The leg assembly can be made of a durable and robust plastic, similar or identical to that used in the main housing. A suitable spring for constructing a stand of size and robustness to hold a light 8 feet above ground is available from VALCO, of Ohio, part number F-224. Preferably the spring snap button has a J-shape or other configuration that will permit a finger to grasp it and pull it so that the button can be pulled free of a corresponding upper detent or lower detent in the mounting board, thereby permitting movement of the legs from being in a locked collapsed or locked extended configuration.

Figure 9:
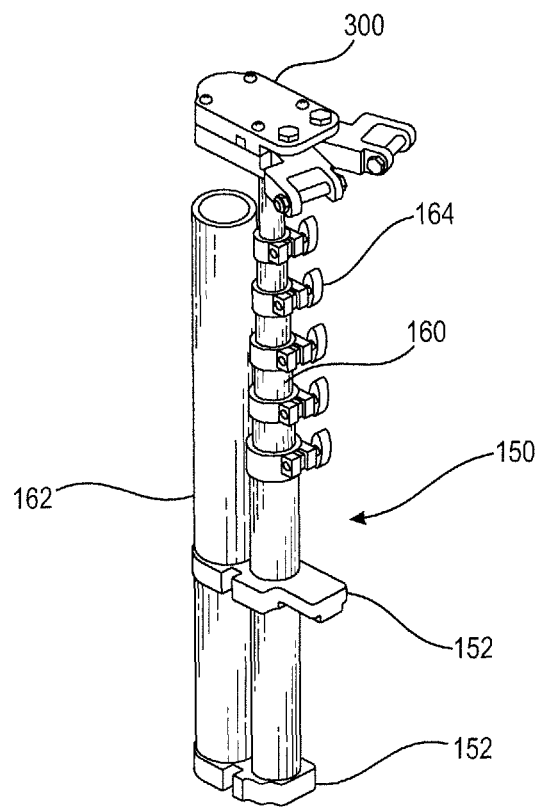
FIG. 9 is a front top perspective view of the isolated telescoping arm assembly with a functional device fitting, including a variation of the height adjustment hardware.
Figure 10:
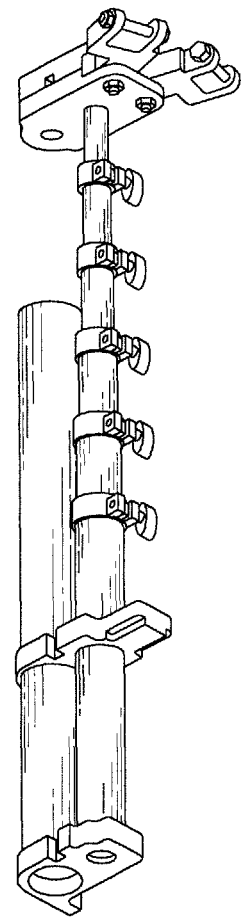
FIG. 10 is a bottom front perspective view of the isolated telescoping assembly of FIG. 9.

Referring to FIGS. 9 and 10, an isolated view of a mast assembly 150 is shown from upper and lower perspectives. A telescoping mast 160 is mounted adjacent to a cord protection sleeve 162. The mast can be formed of aluminum, and a variety of masts are commercially available. Shown in Figures, wingnut assemblies 164 are shown that can be used to loosen and tighten connections between mast sections, however other adjustment mechanisms will also work. A preferred mast is extendable to 8 feet, while the legs can be extended to a total width of about 30 inches. The main housing forms a third legs of a tripod for supporting the mast. Extensions of the legs are envisioned are alternative extendable leg assemblies; for example, legs may retract into cavities in the housing, and the housing may include an outer shape that will fit around a functional device when retracted to protect the functional device.

Figure 11:
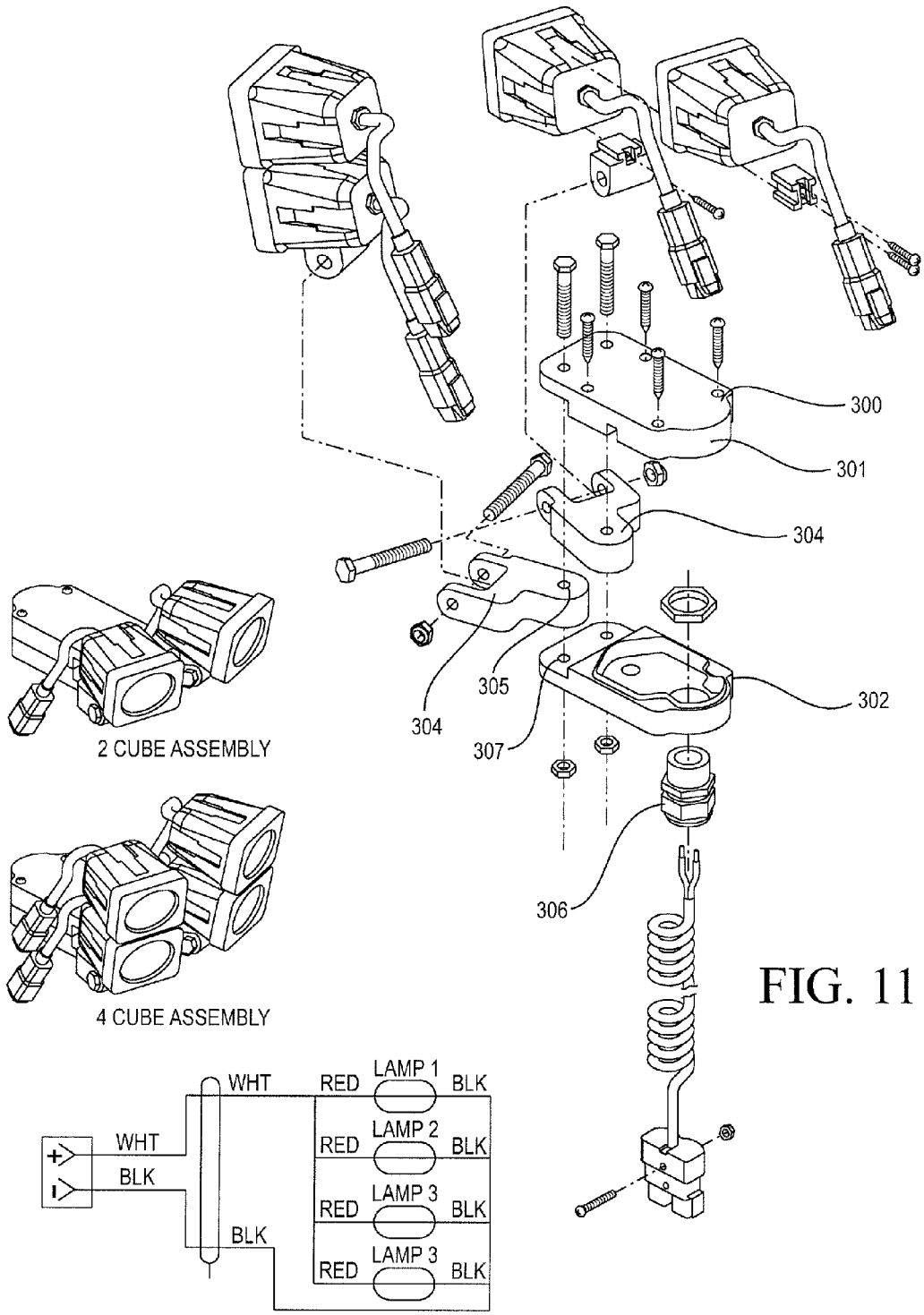
FIG. 11 is an exploded view of the functional device fitting showing how multiple functional devices, in this case lights in cube shaped housings, can be mounted thereto along with a wiring diagram. A single or double light can be pivotally mounted between the legs of an h-shaped bracket, with the opposite end of the h-shaped bracket being pivotally mounted to the main body of the fitting; in this way a light in one bracket can be pivoted up and down while the h-shaped bracket can rotate about its connection to the main body of the fitting.

Referring to FIG. 11, functional devices can be attached to mount 300 by attachment to h-shaped brackets 304. The h-shaped brackets 304 can be pivotally mounted to mount 300 via mounting holes 305 and 307. Mount 300 includes an upper housing 301, a lower housing 302, and includes a fitting 306 for attachment to the top of a mast. Fitting 306 may be extended through the top of mount 300 in an alternative embodiment to support a mast extension and other functional devices mounted thereon. FIG. 11 is taken from drawings used for manufacturing, assembly and use, and includes extraneous part numbers that are not part of the disclosure, and may be ignored (specifically part numbers between 1 and 9 shown in circles). FIG. 11 demonstrates how multiple lights can be mounted to the mast, for example LED lights that provide significant light while using less power. Preferably, a stand in accordance with the present invention will weigh less than 50 pounds, more preferably less than 40 pounds, while providing adequate portable power to supply lights meeting various road safety requirements (e.g., for road flaggers) and/or industrial requirements. Preferably the lights can be stably mounted at least 8 feet above the surface upon which the stand is set. For example, an 800 lumen LED light can provide overhead illumination for highway flaggers up to 200 yards or more. Further, with a charge source, the unit can be continuously charged at 115 VAC and light operations can continue while charging, for example an embodiment includes a 12 Volt power port for quick charge applications. Preferred LED Cube lights and bar lights are commercially available, and can be operated for at least 8 hours from the battery, with specifications set forth in Air Systems AIR LIGHT specifications, available from AIR SYSTEMS, INC., of Chesapeake, Va. USA.

The stabilizing base or main housing can be formed of polyethylene or other suitable robust material, while the housing for the power supply, control panel and mast mount can be of the same or other materials as are customary for such devices used in a variety of rigorous circumstances, for example, road lighting at night in construction zones, etc. In fact, in some circumstances, it is desired, if not required that lights be set up at a specific height to light traffic flaggers. The devices of the present inventions attached are ideally suited for holding lights at a height of at least about 8 feet from the ground, yet are light weight, durable, and easy to set up and collapse, making it an ideal lower cost yet robust portable platform for functional devices. Functional device can include for example a light, a microphone, a still camera, an audio output, a visual output, a laser, a weapon, a video camera, a transmitter, a receiver, a weather monitoring device, a solar panel, a surveying device, a motion sensing device, a chemical sensor, a thermal sensor, an alarm, a wind power generator, and a GPS device.

The details of certain embodiments of the present inventions have been described, which are provided as illustrative examples so as to enable those of ordinary skill in the art to practice the inventions. The description provided is not meant to limit the scope of the present inventions, but to be exemplary. The inventions are capable of other embodiments and of being practiced and carried out in various ways, and as such, those skilled in the art will appreciate that the conception upon which this disclosure is based may readily be utilized as a basis for the designing of other methods and systems for carrying out the several purposes of the present inventions. Where certain elements of the present inventions can be partially or fully implemented using known components, only those portions of such known components that are necessary for an understanding of the present invention are described, and detailed descriptions of other portions of such known components are omitted so as to avoid obscuring the invention. Further, the present invention encompasses present and future known equivalents to the components referred to herein.

What is claimed is:

1. A portable stand comprising: a plastic first case that defines an enclosed space, a mast mount for attaching at least one functional device, extendible and retractable first and second legs, said first and second legs both being located on a first exterior side of said first case so that said first and second legs can be locked in a retracted or extended position, and an extendible telescopic mast located on a second exterior side of said first case directly opposite said first exterior side such that said mast is selectively extended and retracted from said second exterior side, said first case providing said enclosed space in which a power supply and a control panel are contained, said power supply comprising a battery, said mast mount being operatively connected to said mast, wherein said first and second legs may be retracted for transport and storage and said mast can be retracted for transport and storage, said first and second legs and said mast being extendable from said case at a site of use by manipulation of said first and second legs and said mast without requiring connection of parts thereto, wherein said mast can be extended vertically from said first case and said first and second legs can be extended horizontally from said first case to provide stability for said mast when said mast is extended vertically upwards from said first case, and wherein said first case forms a third leg of a tripod.

2. The stand of claim 1, wherein said functional device is selected from the group consisting of a light, a microphone, a still camera, an audio output, a visual output, a laser, a weapon, a video camera, a transmitter, a receiver, a weather monitoring device, a solar panel, a surveying device, a motion sensing device, a chemical sensor, a thermal sensor, an alarm, a wind power generator, and a GPS device.

3. The stand of claim 2, further comprising a control for at least one of a power supply or functional device connected to said stand.

4. The stand of claim 1, said first and second legs being operatively attached to said first case so that said first and second legs can be locked in a retracted or extended position via pivotal and sliding motion.

5. The stand of claim 4, wherein said first leg is operatively attached to said first case via a first fitting having a first elongated channel and a first strut, said first elongated channel and said first strut being coupled to said first leg for controlled movement of said first leg between retracted and extended positions and said second leg is operatively attached to said first case via a second fitting having a second elongated channel and a second strut, said second elongated channel and said second strut being coupled to said second leg for controlled movement of said second leg between retracted and extended positions.

6. The stand of claim 1, further comprising a control for at least one of a power supply or functional device connected to said stand.

7. The stand of claim 1, further comprising a cord protection sleeve adjacent said extendible mast for protecting a power cord that can be connected to and extend from said first case to said mount or to a functional device when a functional device is operatively connected to said mount.

8. The stand of claim 1, wherein said mount provides for pivotal movement of said at least one functional device about multiple axes.

9. The stand of claim 8, wherein a bracket is pivotally attached to said mount and said at least one functional device is pivotally mounted to said bracket.

10. The stand of claim 8, first and second brackets are pivotally attached to said mount and respective functional devices are pivotally mounted to each of said first and second brackets.

11. The stand according to claim 1, wherein said enclosed space of said first case provides a sealed enclosure.

\* \* \* \* \*